United States Patent
Caltrider et al.

(10) Patent No.: US 6,610,220 B1
(45) Date of Patent: *Aug. 26, 2003

(54) PROCESS OF MANUFACTURING CONTACT LENSES WITH MEASURED EXPOSURE TO OXYGEN

(75) Inventors: Jeffrey D. Caltrider, Jacksonville Beach, FL (US); Joseph W. Ricard, Jacksonville, FL (US); Terry L. Spaulding, Jacksonville, FL (US); Jeffrey E. Steven, Jacksonville, FL (US); Olin W. Calvin, Jacksonville, FL (US); John B. Enns, Jacksonville, FL (US); Ture Kindt-Larsen, Holte (DK)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,104

(22) Filed: May 12, 2000

Related U.S. Application Data (63) Continuation-in-part of application No. 09/222,266, filed on Dec. 28, 1998, now Pat. No. 6,241,918.

(51) Int. Cl.$^7$ ................................. B29D 11/00
(52) U.S. Cl. ......................... 264/1.1; 264/2.5
(58) Field of Search ................. 264/1.1, 1.36, 264/1.38, 2.5, 85, 102; 425/808

(56) References Cited

U.S. PATENT DOCUMENTS 4,018,853 A    4/1977  LeBoeuf et al.
4,054,624 A    10/1977 LeBoeuf et al.

(List continued on next page.)

FOREIGN PATENT DOCUMENTS

| EP | 0785854 B1 | 10/1995 |
| EP | 0686491 A  | 12/1995 |
| EP | 0687550 A2 | 12/1995 |
| EP | 0882560 A  | 12/1998 |

OTHER PUBLICATIONS

European Search Report, EP99310517, May 8, 2002.
S. Pauly, Hoechst AG, Werk Kalle, "Permeability and Diffusion Data", "Polymer Handbook" Third Edition, J. Edited by J. Brandrup & E. H. Immergut, pp. VI 435–449.
Singapore Search Report (Austrian Patent Office), dated Jan. 8, 2003, for Singapore Pat. Appln. No. 9906623–5.

Primary Examiner—Mathieu D. Vargot
(74) Attorney, Agent, or Firm—Anne B. Kiernen (57) ABSTRACT

This invention provides a method of manufacturing a contact lens comprising the step of: dosing a contact lens mold comprising optical mold surfaces with an oxygen-sensitive reaction mixture, wherein said optical surfaces of said contact lens mold have between from $0.13 \times 10^{-9}$ to $2.6 \times 10^{-9}$ moles/cm$^2$ O$_2$ available to interfere with the reaction of said reaction mixture. This invention further provides a method of manufacturing a contact lens comprising the steps of: dosing a contact lens mold comprising optical mold surfaces with a reaction mixture, and sealing said reaction mixture and said optical mold surfaces away from a gaseous environment, wherein said optical surfaces of said contact lens mold were exposed to said gaseous environment comprising greater than 0.5 percent oxygen just prior to said sealing step.

17 Claims, 9 Drawing Sheets

U.S. PATENT DOCUMENTS

| | | |
|---|---|---|
| 4,208,365 A | 6/1980 | LeFevre |
| 4,347,198 A | 8/1982 | Ohkada et al. |
| 4,495,313 A | 1/1985 | Larsen ........................ 523/106 |
| 4,609,337 A | 9/1986 | Wichterle et al. |
| 4,640,489 A | 2/1987 | Larsen ........................ 249/127 |
| 4,680,336 A | 7/1987 | Larsen et al. ................ 524/548 |
| 4,786,444 A | 11/1988 | Hwang |
| 4,820,463 A | 4/1989 | Raufast |
| 4,889,664 A | 12/1989 | Kindt-Larsen et al. ...... 264/233 |
| 5,039,459 A | 8/1991 | Kindt-Larsen et al. ....... 264/2.6 |
| 5,219,965 A | 6/1993 | Valint, Jr. et al. |
| 5,230,840 A | 7/1993 | Nishiguchi et al. |
| 5,248,467 A | 9/1993 | Cushman |
| 5,271,875 A | 12/1993 | Appleton et al. |
| 5,310,571 A | 5/1994 | Meadows |
| 5,326,505 A | 7/1994 | Adams et al. |
| 5,391,589 A | 2/1995 | Kiguchi et al. .............. 523/106 |
| 5,555,504 A | 9/1996 | Llepper et al. ............. 364/465 |
| 5,681,510 A | 10/1997 | Valint, Jr. et al. |
| 5,753,150 A | 5/1998 | Martin et al. |
| 5,804,107 A | 9/1998 | Martin et al. |
| 6,241,918 B1 * | 6/2001 | Calvin et al. ................ 264/1.1 |

* cited by examiner

PROCESS OF MANUFACTURING CONTACT LENSES WITH MEASURED EXPOSURE TO OXYGEN

This application is a continuation-in-part of U.S. Ser. No. 09/222,266 titled "Process of Manufacturing Contact Lenses in Ambient Environment", filed Dec. 28, 1998, now U.S. Pat. No. 6,241,918, incorporated herein by reference.

FIELD OF THE INVENTION

This invention relates to the manufacture of polymer contact lenses in an environment that requires the presence of oxygen at the optical surfaces of the contact lens mold in which the contact lens material is reacted.

BACKGROUND OF THE INVENTION

The molding of hydrophilic contact lenses is known. Various processes are disclosed in U.S. Pat. No. 4,495,313, to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention.

These prior art and other references generally disclose a contact lens production process wherein each lens is molded from a reaction mixture, which can be a reactive monomer or prepolymer mixture. The molding is done by a casting process in which the mixture to be polymerized is deposited into one first mold half or section, often referred to as a front curve, then a second mold half or section, often referred to as a back curve is assembled onto the first mold half, and the assembled mold sections are subjected to conditions resulting in polymerization or reaction of the mixture into a contact lens having the shape of the cavity formed between the two mold halves. These mold halves are usually formed from thermoplastic materials transparent to uv radiation such as polystyrene or polypropylene.

If prior to assembly, the mold halves are exposed to oxygen, the polymerization process may be inhibited to such an extent that the contact lenses will not have the desired physical properties. It is known that this is due to the $O_2$ being adsorbed onto and absorbed into the plastic mold halves. It is known that $O_2$ on and in the plastic halves adversely affects the polymerization of the lens material. The effect of $O_2$ on the photopolymerization process is that it strongly inhibits radical-induced polymerization. Polymerization is suppressed until $O_2$ has been consumed by reaction with radicals until the monomer is able to compete successfully with $O_2$ for initiator radicals. Two types of systems have been identified: closed and open. Both types of systems apply to the present invention.

In the closed system, no $O_2$ or a fixed amount of $O_2$ is initially present in the system and polymerization proceeds appreciably after an induction period, during which the $O_2$ is consumed by radicals. In the open system, $O_2$ diffuses into the system and polymerization occurs only if sufficient radicals are generated to successfully compete with the $O_2$. Open systems typically are systems that are open to air.

Exposing mold halves to $O_2$ before assembly of the mold halves leads to a "closed-open" system during polymerization. When the system is open, $O_2$ absorbs onto the surface and absorbs into the mold, thus creating an $O_2$ reservoir. When the mold is assembled (closed), after the induction period when $O_2$ in the monomer and on and in the mold halves is consumed, polymerization proceeds in the lens bulk. The effect on lens properties is dependent on the amount of $O_2$ absorbed into the mold prior to assembly.

The effect of $O_2$ absorbed onto and into the mold on photopolymerization of the reaction mixture is expected to disrupt polymerization at the lens surface, i.e. to cause differential polymerization at the lens surface relative to the lens bulk. This disruption causes more loose polymer ends at the surface due to (premature) termination of polymerization by $O_2$. These shorter chain polymers at the surface of the lens tend to have lower cross link density, less chain entanglement, and more tackiness than the polymer chains in the bulk of the lens. These factors result in reduced mechanical strength and increased water content at the lens surface relative to these properties in the lens bulk.

Under oxygen-free molding conditions, lenses are isotropic in nature. As $O_2$ is introduced to the lens surface and not to the lens bulk during polymerization, lenses become less isotropic in nature and more anisotropic, and control of final lens properties within specified tolerance ranges is compromised.

To reduce the deleterious effect of $O_2$, contact lens manufacture has been carried out in a reduced $O_2$ environment, and/or the reaction mixture is treated to remove dissolved $O_2$ prior to polymerization. In manufacturing, this has resulted in the use of techniques such as physical enclosure of the process and use of large quantities of nitrogen to blanket the assembly and pre-assembly areas. This technique includes the plastic mold halves within the blanketed area since the boundary layer of gases on the plastic surfaces will include $O_2$ if not so protected. Typically, the percent $O_2$ in the atmosphere surrounding the plastic molds halves is monitored and kept below 0.5 percent, the other 99.5 percent of the atmosphere is the inert gas. For example, see U.S. Pat. No. 5,555,504.

The prior art discloses that the amount of oxygen exposure must be limited or avoided to prevent the deleterious effects that the exposure to oxygen has on the manufacture of contact lenses. Various techniques for reducing the deleterious effects of $O_2$ on the polymerization of contact lenses are found in the following U.S. patents:

| | |
|---|---|
| 5,362,767 | Herbrechtmeier, et al |
| 5,391,589 | Kiguchi, et al |
| 5,597,519 | Martin, et al |
| 5,656,210 | Hill, et al |
| 5,681,510 | Valint, Jr., et al |

EP Appln. No. 95937446.3 discloses a process in which plastic molds are treated prior to dosing with the reactive monomer mix to remove substantially all of the $O_2$. The removal of the $O_2$ can be accomplished by contacting the mold pieces with an inert gas or by using a vacuum. Molds that were not treated to remove the $O_2$ provided contact lenses with high percentages of defects.

This invention addresses the need to increase the yields in contact lens manufacturing lines by reducing the percentage of contact lenses which are rejected due to defects.

BRIEF DESCRIPTION OF THE INVENTION

This invention provides a method of manufacturing a contact lens comprising the step of:

dosing a contact lens mold comprising optical mold surfaces with an oxygen-sensitive reaction mixture, wherein said optical surfaces of said contact lens mold have between from $0.13 \times 10^{-9}$ to $2.6 \times 10^{-9}$ moles/cm$^2$ $O_2$ available to interfere with the reaction of said reaction mixture.

This invention further provides a method of manufacturing a contact lens comprising the steps of:

dosing a contact lens mold comprising optical mold surfaces with a reaction mixture, and sealing said reaction mixture and said optical mold surfaces away from a gaseous environment, wherein said optical surfaces of said contact lens mold were exposed to a gaseous environment comprising greater than 0.5 percent oxygen just prior to said sealing step.

During testing of existing manufacturing lines in which the amount of oxygen to which the mold sections was exposed was increased above the amounts that had previously been strictly regulated and kept below 0.5% oxygen, it was discovered that the deleterious effect on contact lens polymer properties due to exposing the contact lens mold halves to $O_2$ did not occur, and that surprisingly the number of delamination sites that formed in the contact lens surface was significantly reduced.

Delamination sites are defects formed on the surface of the contact lens, and are surface voids where no contact lens material is present. The delamination sites or voids are typically 5–20 microns in depth and may cover large portions of the contact lens surface. When the contact lenses are magnified and imaged during the inspection process, the delamination sites look like puddles, so they may be referred to as puddles. Puddles are formed during the reaction or polymerization of the reaction mixture, e.g. polymerizable mixture, to form the contact lens polymer. It is hypothesized that a puddle is formed when the reaction mixture reacts and shrinks quickly away from the surface of a mold section. Eventhough the mold sections may be designed to accommodate some shrinkage of the reaction mixture, the reaction mixture shrinks faster than the mold sections can accomodate. Puddles are not defects formed during the demold step (when the contact lens is removed from the contact lens mold), because they are present on the contact lens after polymerization of the reaction mixture which occurs before the demold step.

After discovering that oxygen present in and on the mold sections was beneficial, testing of various manufacturing conditions was performed to quantify how much oxygen was needed to provide reduced puddles and yet avoid the deleterious effects of the oxygen on the contact lens properties.

OBJECTS OF THE INVENTION

By controlling the time and/or concentration of $O_2$ in the gaseous mixture to which contact lens mold halves are exposed, the percent of contact lenses having puddle defects has decreased from in some cases over 40% to less than 1%. Contact lenses with puddle defects are discarded in the inspection step during their manufacture. A decrease in the discarded lenses leads to an increased yield, which has a significant impact on the manufacturing costs per contact lens. Additionally, increasing the amount of oxygen present in the enclosed volumes in the production line to the levels specified by this invention will decrease the amount of inert gas, $N_2$ or other inert gas, which also leads to cost reductions.

BRIEF DESCRIPTION OF THE DRAWINGS

Other objects and advantages of the present invention will become more apparent upon reference to the following specification and annexed drawings in which:

FIGS. 2 and 3 show different maximum exposure times.

DETAILED DESCRIPTION OF THE INVENTION

This invention relates to a process for manufacturing polymeric contact lenses in molds. The invention provides that the mold sections or halves are exposed to and/or have absorbed a quantity of oxygen within a specified range or are exposed to a gaseous environment having a specified concentration of $O_2$. The oxygen in and on the molds beneficially interferes with the reaction of the contact lens reaction mixture (reactive monomer, polymerization mixture, or prepolymer mixture) which forms the contact lens in the mold, and thereby decreases the occurance of delamination sites in the contact lens. It is hypothesized that the oxygen slows the reaction so that the material does not quickly shrink away from the optical surfaces of the mold.

The contact lens mold used in this invention can be one or more piece molds. For simplicity, the preferred embodiment will be described herein, however, the contact lens mold can take any form. In the preferred embodiment, the contact lens mold comprises a front curve and back curve which are typically of plastic, e. g. polystyrene, polypropylene, or the like. Polystyrene is the preferred plastic. The front curves and back curves, collectively referred to as mold sections, are preferably made in one or more injection molding machines, in injection molds. After the front and back curves are made, the lens is cast molded in a cavity formed when the front and back curves are assembled together (closed) to form a lens mold assembly. The front and back curves are assembled with the reaction mixture, which forms the lens, within the cavity. Polymerization, typically photopolymerization of the reaction mixture takes place with the front and back curves assembled, and later the lens mold assembly is opened to remove the lens. The assembly and pre-assembly processes are carried out at normal processing temperatures, for example 50° F. to 98° F.

In other alternative embodiments, the molds can be reusable molds made from durable materials, such as, glass or polymers.

The reaction mixture used to form the contact lens in the process of this invention can be any reactive monomer mixture or prepolymer material comprising any lens polymerizable or cross-linkable material which undergoes an oxygen-sensitive reaction, e.g. a free radical reaction. The reaction mixture can be degassed or non-degassed. For example, the acrylic or methacrylic monomer system of U.S. Pat. No. Re. 27,401, which is a combination of an acrylic or methacrylic acid monoester with a minor amount of a diester of acrylic or methacrylic acid can be utilized in the present invention. Also disclosed in U.S. Pat. No. Re. 27,401, are the monoesters are hydrophilic hydroxy esters of acrylic or methacrylic acids and a polyhydric alcohol. Similarly, polymerization systems in which vinyl, acrylic or methacrylic monomers are copolymerized with such materials as hydroxyethyl acrylate, vinyl pyrrolidone, acrylaminds, or the like can be used. As examples: polyvinyl alcohol, hydroxyethylmethacrylate, methylmethacrylate, hydroxypropylmethacrylate, glycidylmethacrylate, diacetoneacrylamide or vinyl acetate can be used in combination with acrylamide, hydroxyethylacryulate, acrylic acid, or glycerylmethacrylate, and dimethylamino ethyl acrylate.

At present, it is preferred that the polymerizable acrylic monomer is hydroxy ethyl methacrylate (HEMA) and most preferably, the polymerizable acrylic monomer is a combination of a major portion of HEMA combined with a minor portion of another monomer, which is preferably methacrylic acid (MAA).

A small amount of a crosslinking agent with a functionality of 2 or greater may be added to the monomer or monomer mixture. An example of a preferred crosslinking agent is ethylene glycol dimethacrylate, and 1,1,1-trimethyloyl propane trimethacrylate (TMPTMA). Additionally, the reaction mixture preferably comprises a photoinitiator, such as 2-hydroxy-2-methyl-1-phenyl-propan-1-one. The contact lenses made by the process of this invention are preferably hydrogels which comprise 40–75% water.

The amount of $O_2$ most concern is that amount of $O_2$ at might become available during polymerization to the polymerizing surfaces of the reaction mixture adjacent to the optical surfaces of the mold halves. The optical surfaces of the contact lens mold are the inside surfaces of the mold which define the shape of the contact lens, and are adjacent to the contact lens reaction mixture.

It has been discovered that the mold halves dosing and sealing steps, and any transport step or steps to and between the dosing and sealing steps preferably should be carried out in a gaseous environment that allows the optical surfaces of the contact lens mold to absorb more $O_2$ than had been provided for in the earlier manufacturing processes just prior to closing the mold in the sealing step, but not so much $O_2$ that the base curve dimensions fall out of specification. That is, there is a range of oxygen present on the optical surfaces of the contact lens mold which provides decreased puddles in the contact lenses manufactured, but does not negatively impact the base curve of the contact lenses.

Typically, polymeric mold sections are formed in injection molding machines. In one embodiment, mold sections are produced at a location away from the contact lens manufacturing line. Prior to their introduction into the manufacturing line to produce contact lenses, the mold sections are treated to remove the oxygen, for example, by an eight hour vacuum cycle. In an alternative embodiment, the mold sections are injection-molded immediately prior to molding which preferably eliminates the need for the vacuum cycle to evacuate the $O_2$; however, the injection molding machine may or may not be enclosed by a regulated gaseous environment.

Preferably in each embodiment, the exposure to $O_2$ ($O_2$ exposure time) is established from the opening of the injection molds used to make the mold halves or the removal of the mold halves from the vacuum treatment which exposes the mold halves to a gaseous environment comprising $O_2$ until the optical mold surfaces of the mold and preferably the reaction mixture are sealed from the surrounding gaseous environment (air or otherwise). Depending on the embodiment, the gaseous environment may be ambient air, an inert and $O_2$ gas mixture if at least some of the production equipment is enclosed, or ambient air and then an inert gas and $O_2$ mixture if at least some of the production equipment, but not the injection molding machine is enclosed. The gaseous environment to which the mold sections are exposed can be an inert gas mixture by enclosing the production equipment. The enclosure can be built using plexiglass to create an enclosed environment in which the concentration of one or more gases can be regulated, using instruments which measure concentrations and control the valves on gas storage containers. Preferably, the mold sections may be exposed to a combination of ambient air and a regulated gaseous environment if the injection molding machine is exposed to air. Preferably, the mold sections are quickly shuttled into the regulated environment comprising the inert gaseous mixture. In another embodiment, the mold sections may be produced in an injection molding machine and exposed to ambient air for less than 70 seconds, more preferably for between 1 to less than 70 seconds until the optical mold surfaces and reaction material are sealed from the gaseous environment. This process does not require any regulated inert gaseous environments and is further described in the parent application, U.S. Ser. No. 222,266.

The sealing or closing step usually occurs by assembling the mold sections, putting one section on top of the other section and pressing the mold sections together; however, the sealing step can be accomplished in alternative ways. The only requirement for the sealing step is that the optical surfaces of the contact lens mold are no longer exposed to the gaseous environment comprising oxygen; therefore, for example, the dosing step may be a sealing step too, for example, for a one-piece mold with a small opening for the input of the reaction mixture. Typically, prior to sealing or closing the optical mold surfaces and preferably the polymerization mixture away from the gaseous environment, the polymerization mixture is placed or dosed into the mold halves. In the preferred embodiment, the polymerization mixture is dosed into a front curve (mold half) and the back curve (mold half) is placed onto the front curve which closes the contact lens mold, with the reaction mixture contained therein to form the lens mold assembly. When the lens mold assembly is closed the polymerization mixture and two optical mold surfaces are no longer exposed to the gaseous environment. It has been found that there is a significant reduction in the number of puddles present on the surfaces of contact lenses if the amount of $O_2$ that is absorbed by the optical surfaces of the mold sections is carefully regulated, and is more than previously disclosed in the prior art. The amount of $O_2$ is preferably regulated in this method by exposing the contact lens mold to a specified concentration of $O_2$ just prior to said sealing step. Just prior to the sealing step means that the sealing step directly follows the exposure, and preferably the sealing step occurs in the same gaseous environment having the specified concentration of $O_2$ to which the molds were exposed. If not, the sealing step preferably occurs within 10 seconds, more preferably within 5 seconds following the exposure of the mold to the gaseous environment comprising the specified concentration of $O_2$.

This invention provides a method of manufacturing a contact lens, wherein said optical surfaces of said contact lens mold have between from $0.13 \times 10^{-9}$ to $2.6 \times 10^{-9}$ moles/cm$^2$ O$_2$, more preferably between from $0.17 \times 10^{-9}$ to $2.4 \times 10^{-9}$ moles/cm$^2$ O$_2$, and most preferably between from $0.37 \times 10^{-9}$ to $2.1 \times 10^{-9}$ moles/cm$^2$ O$_2$, available to reduce the reaction rate of the reaction mixture adjacent to the optical surface of said molds.

This invention further provides a method of manufacturing a contact lens, wherein said optical surfaces of said contact lens mold are exposed to a gaseous environment just prior to the time of sealing the mold sections comprising greater than 0.5 percent O$_2$, preferably greater than 0.6 percent O$_2$, or preferably greater than 0.5 to 20 or 21 percent O$_2$, more preferably between from 0.6 to 20 or 21 percent O$_2$, more preferably between from 0.8 to 20 percent O$_2$, and most preferably between from 0.8 to 15 percent O$_2$, which provides for the absorption of enough O$_2$ to absorb into the optical surfaces of the mold sections to prevent the formation of puddles on the surface of the contact lens during curing or reaction of the reaction mixture. A gaseous environment comprising greater than 21 percent O$_2$, i.e., more O$_2$ than is present in the ambient environment might be necessary to get the benefits of this invention if the processing speeds are such, and/or the absorption characteristics of the mold section materials require a higher percent O$_2$ to provide for the desired reduction in the formation of puddles.

For a method in which the mold sections are exposed to ambient air, the amount of time that the mold sections are exposed to ambient air should be less than 70 seconds, preferably between 1 and 70 seconds, more preferably between and 2 and 57 seconds, and most preferably between 3 and 45 seconds to provide for a reduction in the percent contact lenses having puddles without sacrificing lens properties.

For one embodiment in which the mold sections are produced in an injection molding machine and placed into a regulated enclosed gaseous environment just after, that is within 15 seconds, more preferably less than 10 seconds after removal from the injection molding machine, the percent O$_2$ present in the otherwise inert gasous environment present in the enclosure around the mold sections is at least 0.6 percent, the most preferred being from 1 to 5 percent. For this embodiment having a gaseous environment consisting of approximately 2 percent O$_2$, the exposure time is preferably greater than 20 seconds, more preferably from 30 to 4,000 seconds, most preferably from 80 to 4000 seconds. For the same embodiment having a gaseous environment consisting of 1 percent O$_2$, the exposure time is preferably greater than 80 seconds, more preferably from 125 to 10,000 seconds, most preferably from 160 to 3,600 seconds.

For another embodiment in which the mold sections are produced in an injection molding machine, treated (in a vacuum) to remove absorbed and adsorbed O$_2$ and placed into a regulated enclosed gaseous environment just after, that is within 3 seconds, more preferably less than 1 second after removal from the treatment. The percent O$_2$ present in the otherwise inert gasous environment present in the enclosure around the mold sections is greater than 0.5 percent, more preferably 0.6 to 2 percent, most preferably 0.6 to 1 percent. For this embodiment having a gaseous environment consisting of 0.6 to 1 percent O$_2$, the exposure time is preferably greater than 80 seconds, more preferably from 100 to 4,000 seconds, most preferably from 200 to 4,000 seconds.

For any embodiment, if the gaseous environment is 2 to 5 percent oxygen, the exposure time of the optical surfaces of the mold should be between 20 to 1300 seconds, more preferably 30 to 800 seconds. If the gaseous environment is 5 to 10 percent oxygen, the exposure time of the optical surfaces of the mold should be between 40 to 300 seconds, more preferably 60 to 190 seconds. For any embodiment, if the gaseous environment is 0.6 to 4, more preferably 0.6 to 3 and most preferably 0.6 to 2.5 percent oxygen, the exposure time of the optical surfaces of the contact lens mold can be unlimited without having a negative impact on the contact lens parameters.

Figure 4:
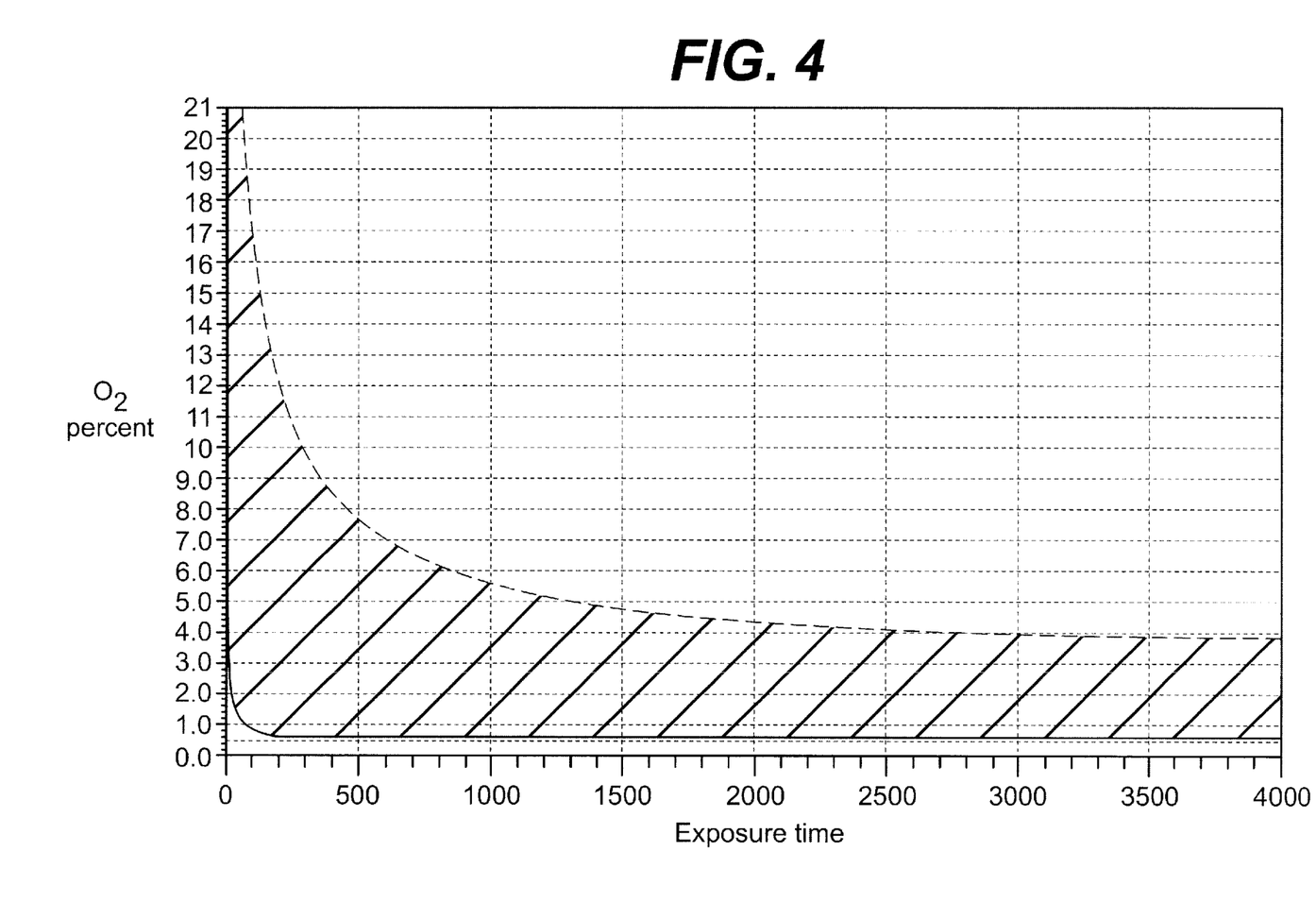
FIGS. 4 and 5 show a perferred operating range of concentrations of oxygen in the gaseous environment and the exposure times of the contact lens mold to the gaseous environment.
Figure 5:
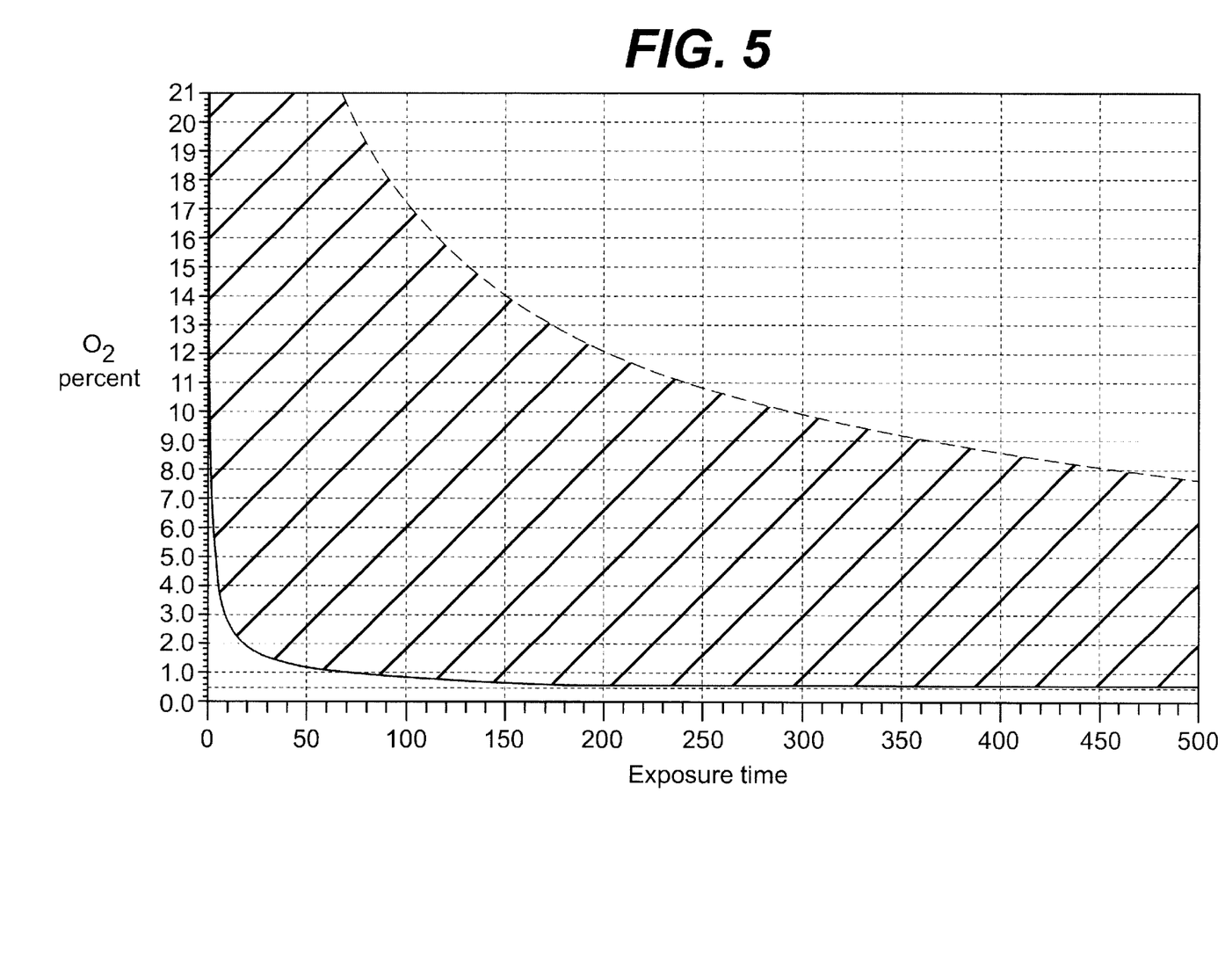
Figure 6:
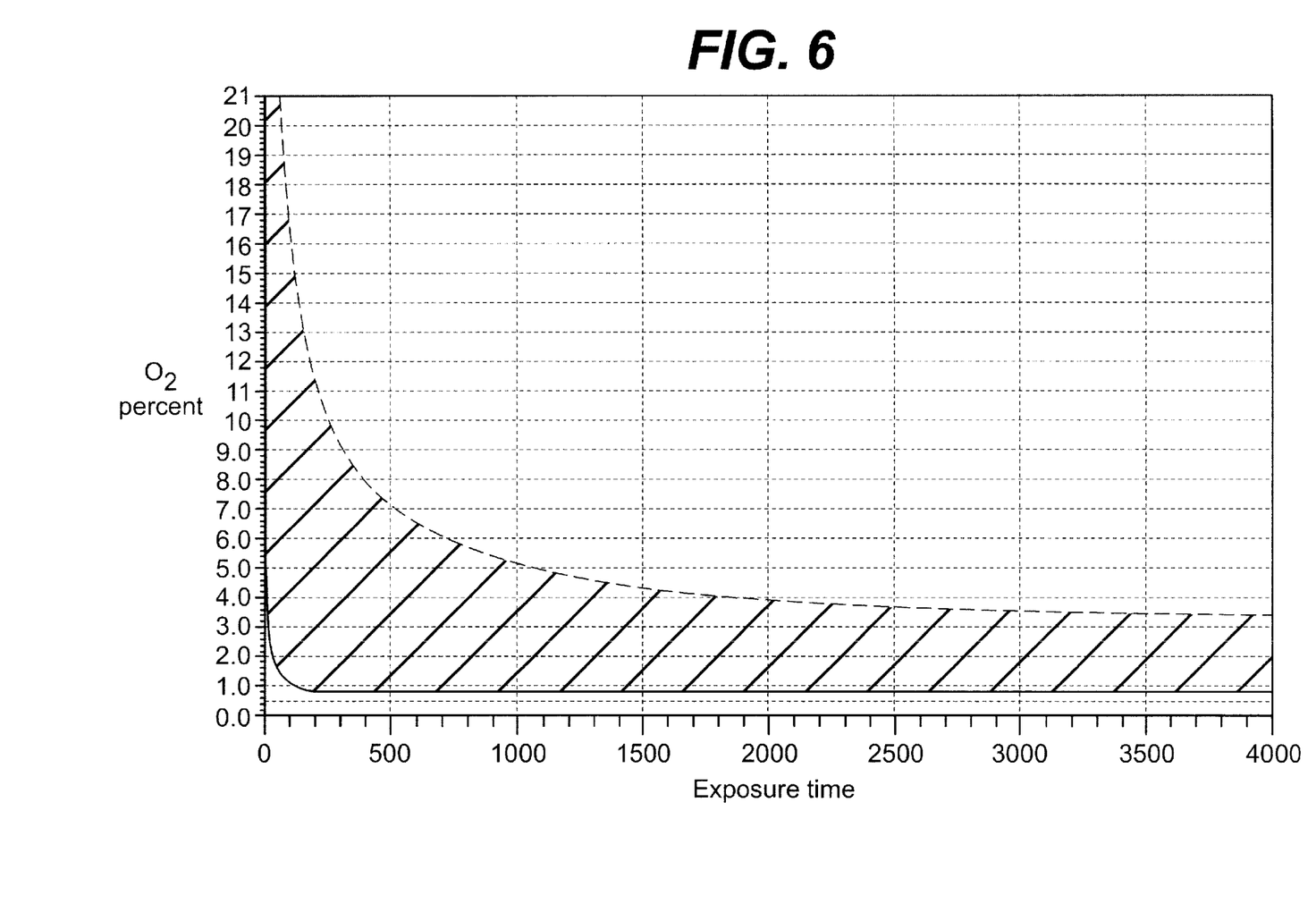
FIGS. 6 and 7 show a more perferred operating range of concentrations of oxygen in the gaseous environment and the exposure times of the contact lens mold to the gaseous environment.
Figure 7:
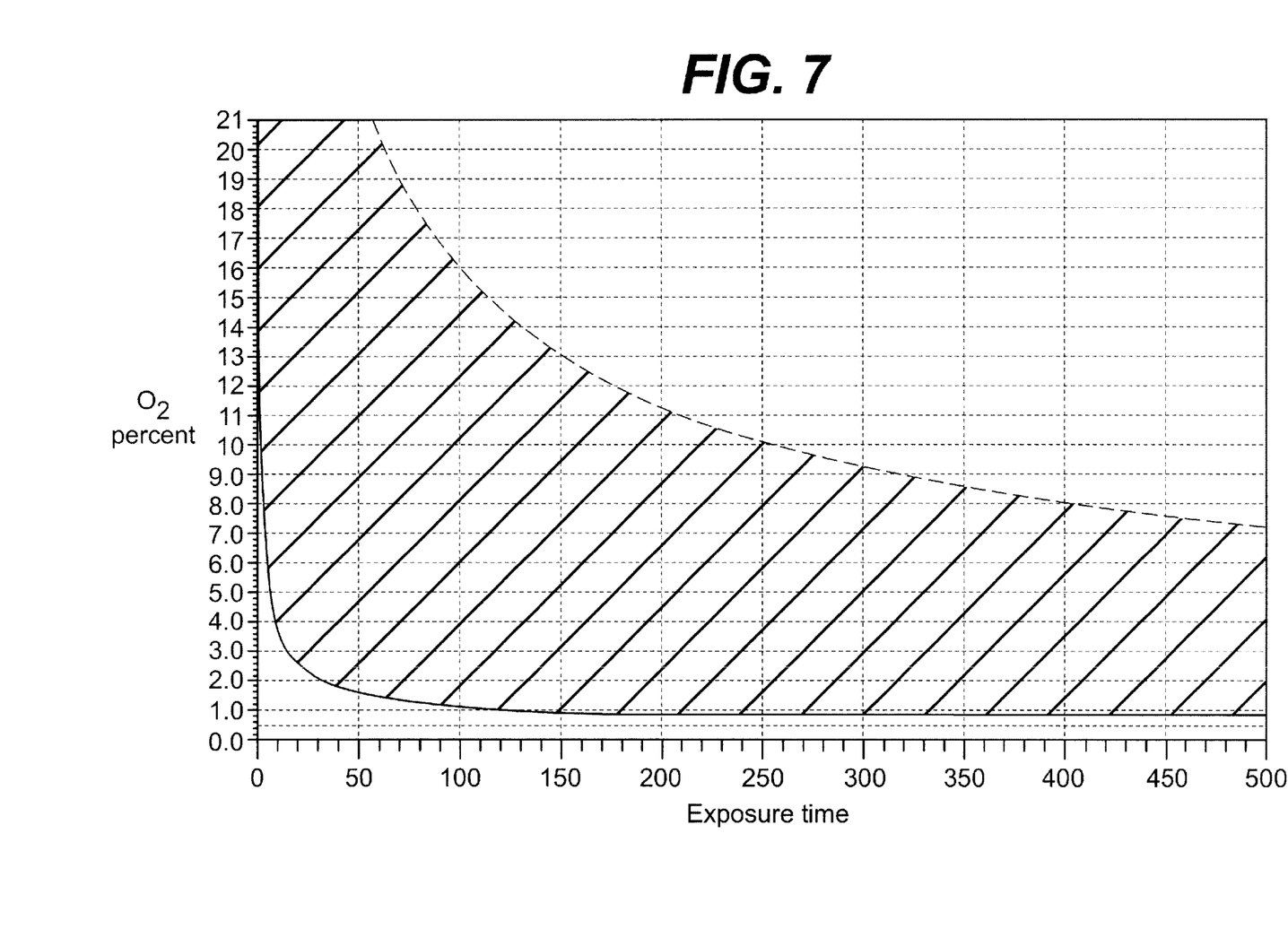
Figure 8:
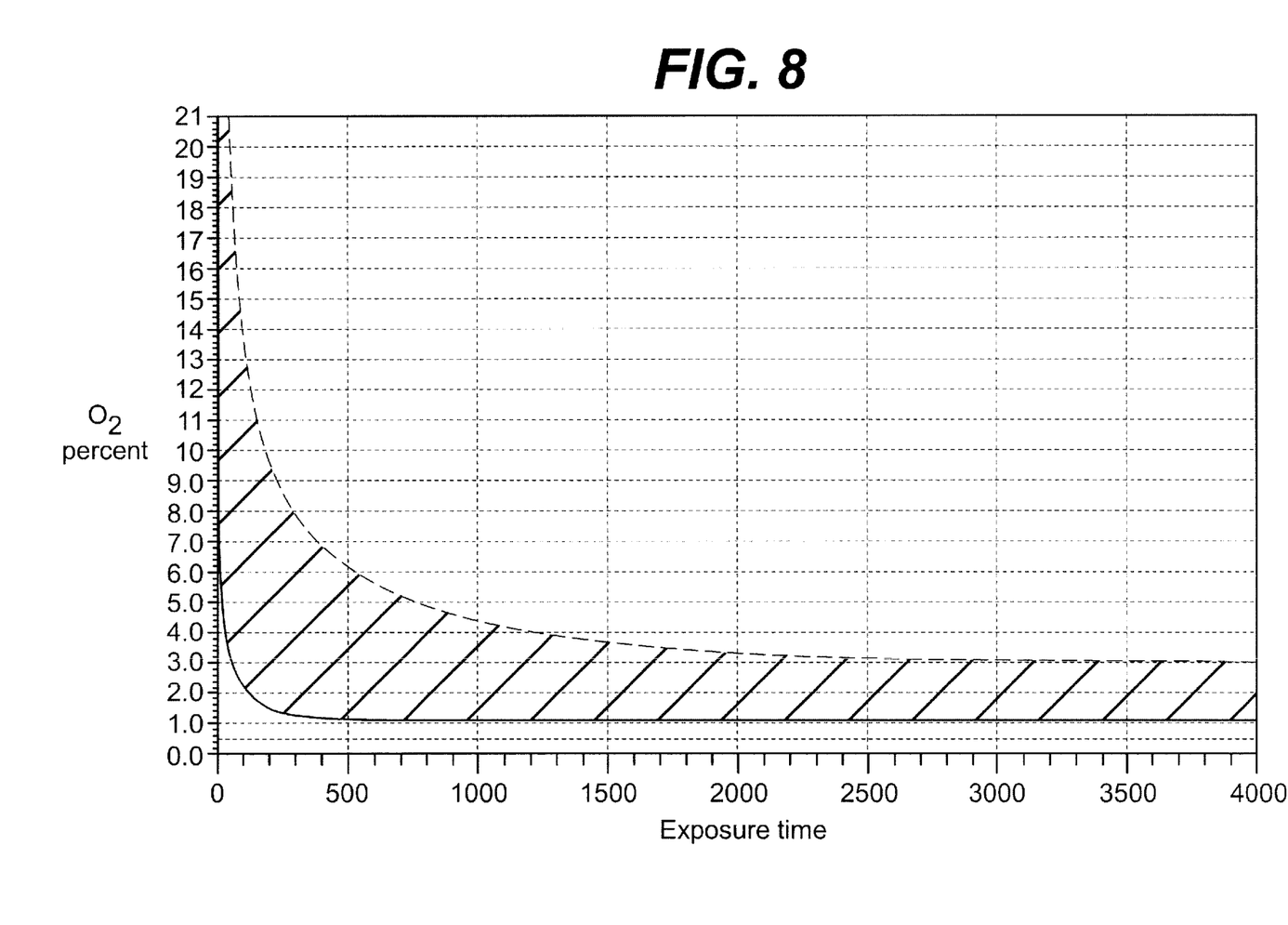
FIGS. 8 and 9 show the most perferred operating range of concentrations of oxygen in the gaseous environment and the exposure times of the contact lens mold to the gaseous environment.
Figure 9:
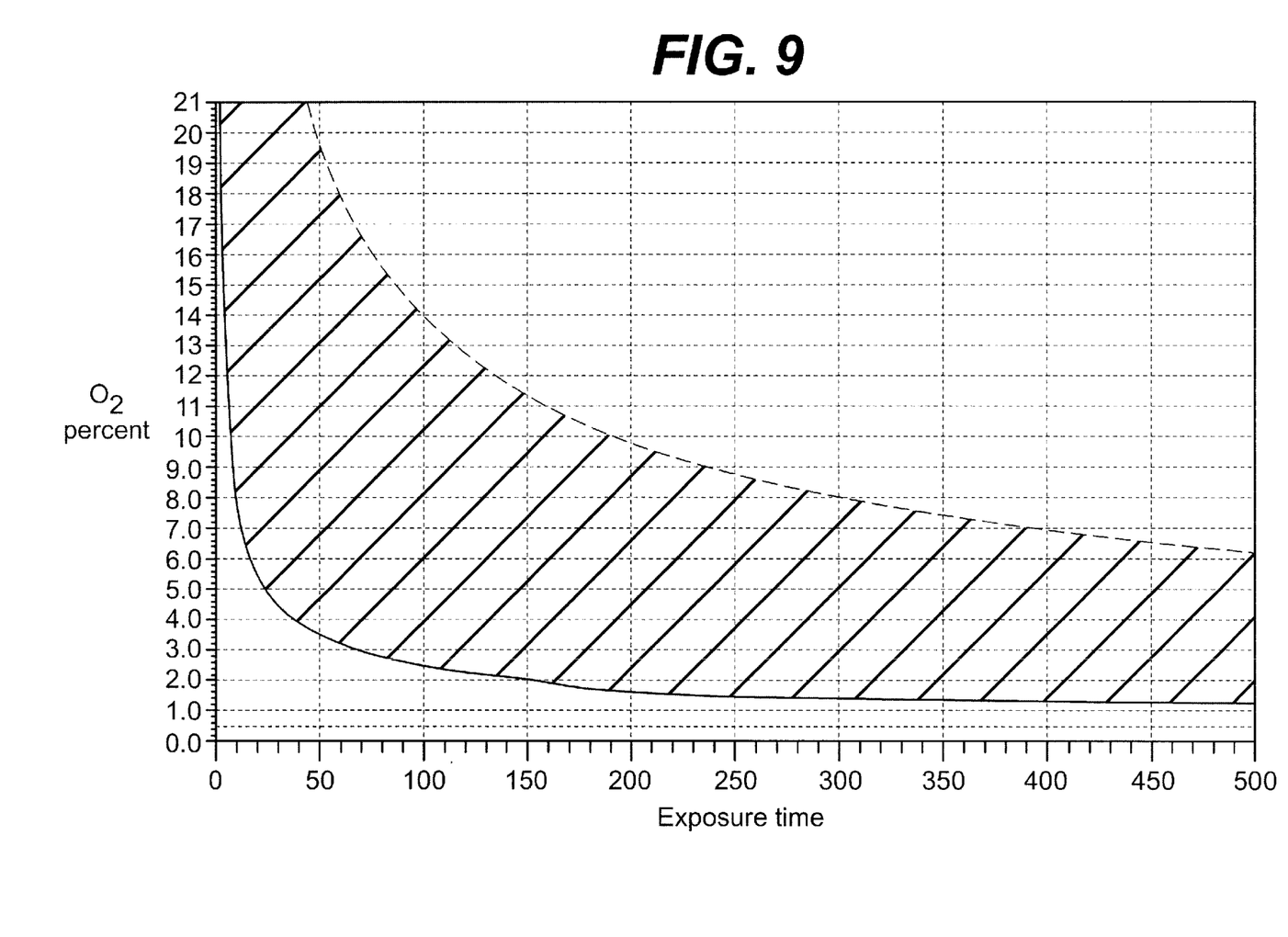

The operating ranges of this invention which provide decreased delamination sites in contact lens produced according to this invention are in the hatched area shown in FIGS. 4 and 5. The operating ranges are the O$_2$ concentration in the gaseous environment to which the contact lens mold is exposed to just prior to sealing the mold, and the corresponding exposure times for that concentration of O$_2$. The preferred operating ranges are shown in FIGS. 6 and 7, and the most preferred operating ranges are shown in FIGS. 8 and 9. The data points used to generate the FIGS. 4 and 5 were the same, the only difference is the time axis. FIG. 5 shows in more detail the curve between 0 and 500 seconds. The other pairs of figures, that is, FIGS. 6 and 7, and FIGS. 8 and 9 differ only by the time axis also.

To determine the operating ranges specified herein, a number of experiments were carried out. The results of the experiments and some of the characteristics of the experiments are listed in the Table below. Each of the experiments, called runs, represent the production of Etafilcon A contact lenses in 3 different types of manufacturing lines. One type of the Etafilcon A contact lenses produced had a polymerization mixture which contained three times the level of photoinitiator used in the other two polymerization mixtures used. Otherwise, the polymerization mixtures were similar. It was noted that the contact lenses produced having the higher photoinitiator level in the reaction mixture were less sensitive to the oxygen in and on the contact lens mold than the other contact lenses produced.

EXAMPLES

Contact lenses comprising Etafilcon A were produced in three types of manufacturing lines, indicated as Manufacturing Lines A, B, and C in the table below.

Manufacturing Line A

Mold sections were prepared by a supplier, packaged and shipped to Vistakon. Prior to their use, essentially all the molecular oxygen was removed from the mold sections by exposing the mold sections to vacuum for a minimum of 8 hours, then the molds were held in a nitrogen environment. Only after the mold sections were inserted into the manufacturing line was oxygen introduced. The levels of oxygen are recorded in the table below.

After the mold sections were inserted into the manufacturing line, they were exposed to the oxygen level listed in the table for the time listed in the table. For all runs, 256 cured mold assemblies were sampled in-process, i.e after exiting the cure tunnel, for puddles and the percentage of lenses with puddles was calculated. In addition, a sample of 50 lenses per run were analyzed for base curve, power, center thickness and diameter after all the manufacturing steps, i.e., deposition, sealing, curing, demolding, hydration, and packaging steps. In all cases, lenses met the specified parameter requirements.

Manufacturing Line B

Lens mold sections were injection molded and transferred to an enclosed environment for which the oxygen level was controlled prior and through the dosing and assembling sealing steps. Mold sections were exposed to atmospheric oxygen for a maximum of 15 seconds during transfer to the enclosed environment. Mold sections were then exposed to the levels of oxygen in the controlled environment as recorded in the table.

For all runs, 128 or 256 cured mold assemblies were sampled in-process (tunnel audit) for puddles and the percentage of lenses with puddles was calculated, and a sample of 50 finished lenses which went through the steps of deposition, sealing, curing, demolding, hydration, and packaging per run was inspected for base curve, power, center thickness and diameter. In all cases, the lenses met the specified parameter requirements.

Manufacturing Line C

Lens mold sections were injection molded and transferred to the deposition sealing, curing, demolding, and hydration steps. The mold sections were exposed to air for the time specified within the table. 50 finished lenses per run were inspected for puddles and measured for base curve, power, center thickness and diameter. In all cases, there were no puddles present on finished lenses and the lenses met the specified parameter requirements. No tunnel audits were performed.

The results from the Examples are listed in the following Table.

As already stated, the base curve is the parameter of the contact lens that most sensitive to changes caused by oxygen. An acceptable base curve sample is defined when:
(Label Target−Sample Average)/3×(Sample Standard Deviation)>1.00. All the contact lenses tested above were acceptable.

Sample percent puddles are acceptable when the rate of puddles measured during the in-process tunnel audit is less than 3.5%, more preferably less than 3.0% and most preferably less than 2%.

The results in the table indicate that the increased exposure of the mold sections to $O_2$, by increasing the concentration of $O_2$ in the gaseous environment in which the mold sections are transported or held in prior to the sealing step (and during the preceeding deposition step), provides a signifiant reduction in the number of puddles. This result was not predictable.

Once the exposure time is measured, the amount of $O_2$ absorbed into a unit cross-sectional volume of the mold halves can be determined, because it is a function of the permeability of the mold material, the mean thickness (L) of said volume as measured perpendicular to the surfaces exposed to $O_2$, the concentration gradient of $O_2$, and the amount of time the mold halves are exposed to $O_2$. Permeability (p) is defined as the product of diffusivity (D) and solubility (k): p=D*k. Diffusivity and solubility are both functions of temperature and front and back curve mold materials. The diffusivity of $O_2$ in polystyrene at room

TABLE

| Mfg. Line | $O_2$ Level | Estimated $O_2$ Exposure Time | MIN $O_2$ Amount (moles/cm^2×10^9) | MAX $O_2$ Amount (moles/cm^2×10^9) | Sample % Puddles Observed |
|---|---|---|---|---|---|
| A | 0.0% | 200–1200 seconds | . | 0.0 | 87.5% |
| A | 0.1% | 200–1200 seconds | . | <0.1 | 41.4% |
| A | 0.3% | 200–1200 seconds | . | <0.1 | 6.3% |
| A | 0.5% | 200–1200 seconds | 0.11 | 0.25 | 3.9% |
| A | 0.6% | 200–1200 seconds | 0.13 | 0.30 | 0.8% |
| A | 0.8% | 200–1200 seconds | 0.17 | 0.40 | 0.0% |
| A | 1.0% | 200–1200 seconds | 0.21 | 0.50 | 0.0% |
| A | 1.0% | 200–1200 seconds | 0.21 | 0.50 | 0.0% |
| A | 1.0% | 3720–4800 seconds | 0.69 | 0.70 | 0.0% |
| A | 1.2% | 200–1200 seconds | 0.27 | 0.60 | 0.0% |
| A | 1.4% | 200–1200 seconds | 0.30 | 0.70 | 0.0% |
| A | 1.6% | 200–1200 seconds | 0.34 | 0.80 | 0.0% |
| A | 1.8% | 200–1200 seconds | 0.39 | 0.90 | 0.0% |
| A | 2.0% | 200–1200 seconds | 0.43 | 1.00 | 0.0% |
| A | 2.0% | 3720–4800 seconds | 1.37 | 1.40 | 0.0% |
| B | <0.5% | 160–378 seconds | . | <0.15 | 18.8% |
| B | <0.5% | 160–378 seconds | . | <0.15 | 31.8% |
| B | <0.5% | 160–378 seconds | . | <0.15 | 46.4% |
| B | 1.0% | 160–378 seconds | 0.2 | 0.3 | 2.6% |
| B | 1.0% | 520–738 seconds | 0.3 | 0.4 | N/O |
| B | 1.0% | 858 to 1076 seconds | 0.4 | 0.5 | N/O |
| B | 2.0% | 160–378 seconds | 0.4 | 0.6 | 1.0% |
| B | 2.0% | 520–738 seconds | 0.7 | 0.8 | N/O |
| B | 2.0% | 858 to 1076 seconds | 0.9 | 1.0 | N/O |
| B | 2.0% | 1560–1938 seconds | 1.1 | 1.2 | N/O |
| B | 3.0% | 160–378 seconds | 0.6 | 0.9 | 1.0% |
| B | 3.0% | 520–738 seconds | 1.0 | 1.2 | N/O |
| B | 3.0% | 858 to 1076 seconds | 1.3 | 1.5 | N/O |
| B | 5.0% | 160–378 seconds | 1.0 | 1.5 | 1.6% |
| B | 5.0% | 520–738 seconds | 1.7 | 2.0 | N/O |
| B | 5.0% | 858 to 1076 seconds | 2.2 | 2.4 | N/O |
| C | 21.0% | 24 seconds | . | 1.5 | N/O |
| C | 21.0% | 40 seconds | . | 2.0 | N/O |
| C | 21.0% | 70 seconds | . | 2.6 | N/O |

Figure 1:
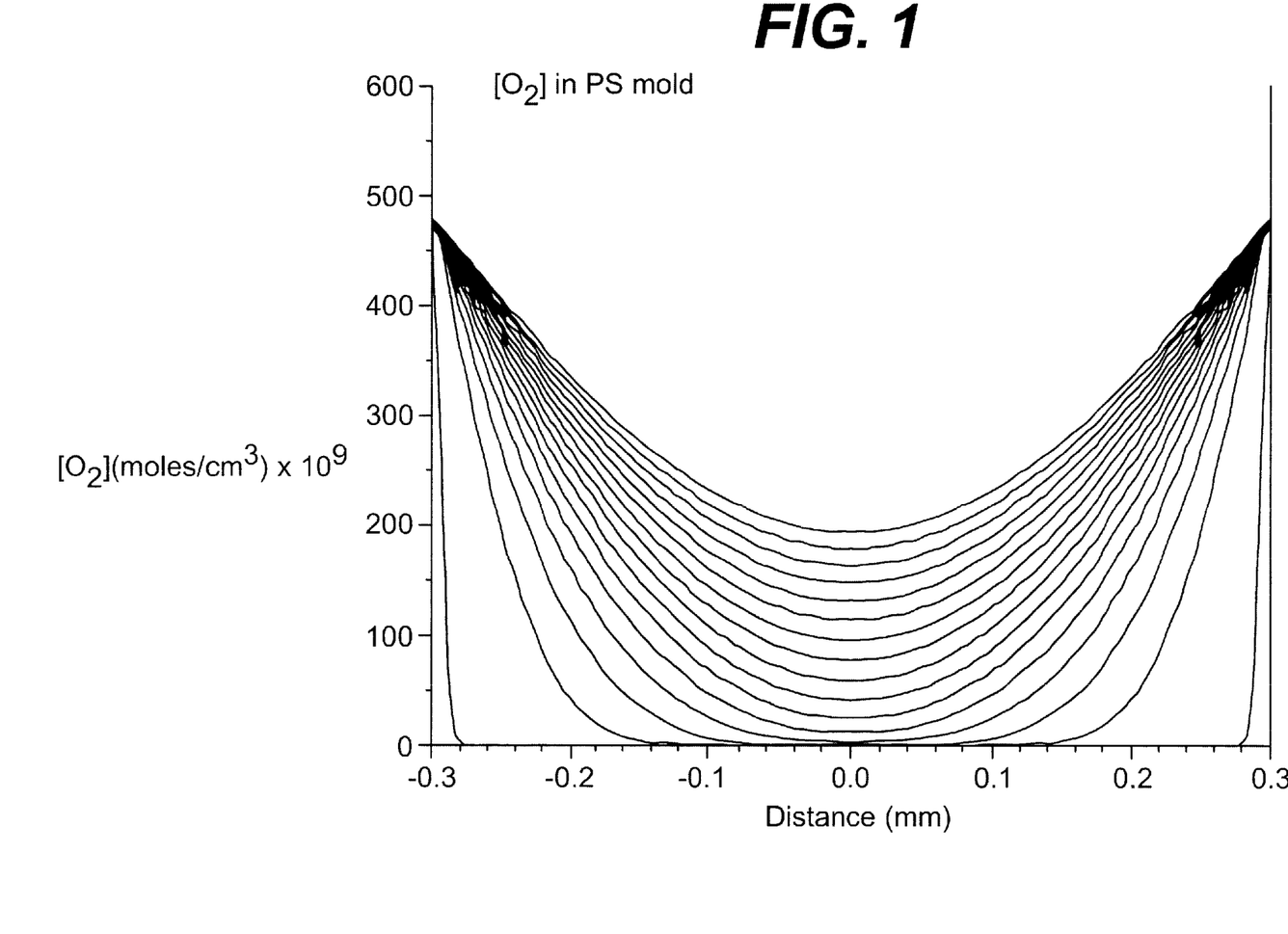
FIG. 1 is a graph of the $O_2$ concentration in a 0.6 mm thick polystrene mold half as a function of position across the thickness of the mold half where 0 represents the middle of the thickness of the mold half. Each curve represents the $O_2$ concentration at each 1 minute interval from 1 to 15 minutes after the oxygen-free mold is exposed to ambient air except for the first line (the line nearest the edge of the mold), which represents an exposure of 1 second.

N/O = No Audits Taken, No Puddles were observed during Runs or Finished Lens temperature (25° C.) is $1.1 \times 10^{-7}$ cm$^2$/sec. The solubility of $O_2$ in polystyrene at room temperature (25° C.) is $5.5 \times 10^{-2}$ cm$^3$(STP)/(cm$^3$bar), or $2.45 \times 10^{-6}$ moles/(cm$^3$bar). If the temperature and materials are fixed, then the amount of $O_2$ of most concern at any given time simplifies to a function of thickness, $O_2$ concentration gradient and time. If the thickness and concentration gradient are fixed, then this amount of $O_2$ becomes a function of time. The thickness is fixed by back curve and front curve mold geometry. The concentration gradient is fixed by assuming that the front curve and back curve material (e.g. polystyrene) is essentially degassed either during the injection molding process or by vacuum treatment, and by knowing or controlling the $O_2$ concentration of the environment surrounding the mold halves. The total amount of $O_2$ of most concern is then calculated by knowing the exposure time to $O_2$ and by summing the total number of unit volumes making up the optical surfaces of the mold halves and the immediate vicinity thereof. If the environment surrounding the mold halves is air, then the exposure time is known as the air exposure time. This formula was used to generate FIG. 1 which shows the amount of $O_2$ in a 0.6 mm thick polystyrene mold as a function of the position across the thickness at various times after injection molding in ambient air. The lines on FIG. 1 represent various times after initial exposure. The lines from lowest to highest concentration of $O_2$ were calculated at 1 second, and from 1 minute to 15 minutes by 1 minute intervals. Using the same equation, additional figures similar to FIG. 1 at different levels of oxygen in the gaseous environment can be generated. These figures are not shown here. FIG. 1 shows that if the mold exposure time to oxygen is not unlimited, then a parabolic oxygen concentration will be formed, with the oxygen content in the mold decreasing as one moves toward the interior of the mold.

Figure 2:
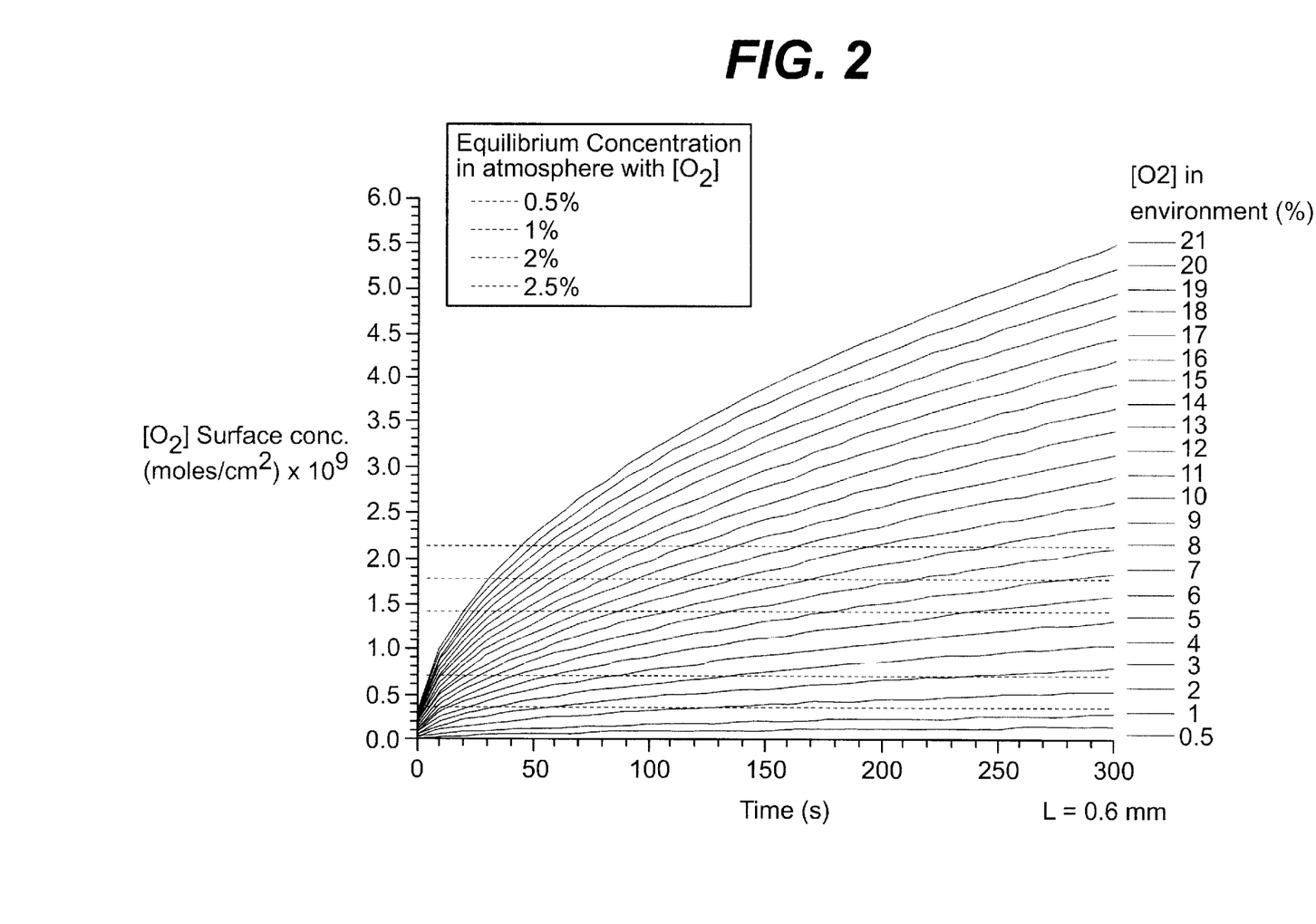
FIGS. 2 and 3 are graphs of the amount of $O_2$ absorbed by a 0.6 mm thick polystrene mold half as a function of exposure time in a controlled gaseous environment consisting of various percentages of oxygen.
Figure 3:
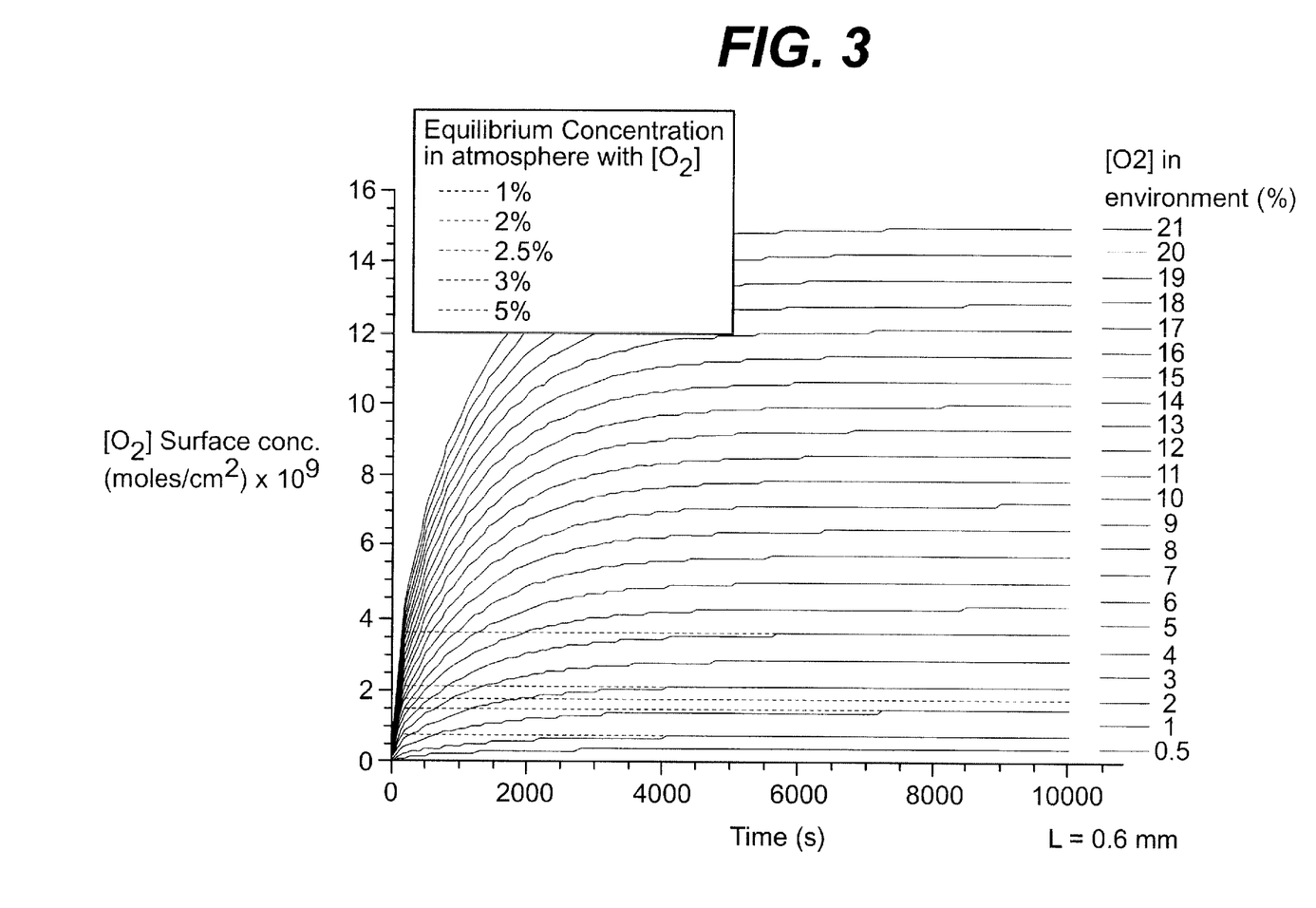

It is important to recognize that oxygen adsorbed on the mold surfaces is the most available to slow the reaction of the reaction mixture, but oxygen absorbed into the molds may diffuse back to the surface during polymerization and have an effect on polymerization. For the geometry of our front and back curves, only about half of the $O_2$ absorbed in the optical region of the mold was available to interfere with the polymerization reaction. Using these assumptions based on actual experimentation, FIGS. 2 and 3 were produced from which the total amount of $O_2$ available to interfere with the polymerization of the reactive monomer mixture can be determined. From FIG. 2, the amount of $O_2$ which is available to interfere with the polymerization reaction at 70 seconds is $2.6 \times 10^{-9}$ moles/cm$^2$, at 57 seconds is $2.4 \times 10^{-9}$ moles/cm$^2$, and at 45 seconds is $2.1 \times 10^{-9}$ moles/cm$^2$ for each of the surfaces of the front and back curves.

The exposure time for a mold material other than polystyrene for an environment having a given $O_2$ concentration may be related to the exposure time for polystyrene if the permeability of $O_2$ for that material and the thickness of the material is known. This relationship is stated as follows:

Exposure time for $NM$=(Exposure time for $PS$)*($D*k$ for $PS$)/($D*k$ for $NM$)

Where: NM=new material

PS=polystyrene

D=diffusivity of $O_2$ in the mold material, k=solubility of $O_2$ in the mold material, and

* is the multiplication symbol.

Thus, for a material having a solubility of $5.5 \times 10^{-2}$ cm$^3$(STP)/(cm$^3$bar) but only one-half (0.5) the diffusivity, the exposure time for the new material equivalent to a 70 second exposure time for polystyrene both molds being exposed to the same concentration of $O_2$ would be calculated as follows:

Air exposure time for $NM$=(70 seconds)*(1*1 for $PS$)/(0.5*1 for $NM$)

Air exposure time for $NM$=140 seconds.

The same calculation can be used to determine the range of exposure times for a new contact lens mold material at any concentration of $O_2$ to get the benefit of this invention, by using the operating ranges for polystyrene specifically disclosed herein, and shown in FIGS. 4 to 9 at the same concentration, when the solubility and diffusivity of the new material is known or can be determined.

The exposure time or concentration of $O_2$ may also be increased by using an inert gas, like nitrogen, in and around the injection molding region wherein the plastic mold halves are produced, for example, for pressurized gas ejection of the mold halves from the mold. The inert gas in this area would provide a boundary layer of the inert gas around the front and back curves which would slow the uptake of $O_2$ when the front and back curves mold halves are subsequently exposed thereto.

All patents, applications, publications, and the method mentioned herein are hereby incorporated by reference.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed:

1. A method of manufacturing a contact lens comprising the steps of:

dosing a contact lens mold comprising optical mold surfaces with an oxygen-sensitive reaction mixture, wherein said optical surfaces of said contact lens mold have between from $0.13 \times 10^{-9}$ to $2.6 \times 10^{-9}$ moles/cm$^2$ $O_2$ available to interfere with the reaction of said reaction mixture, and sealing said optical mold surfaces away from air, wherein said optical surfaces of said contact lens mold were exposed to air for 1 to 70 seconds just prior to said sealing step.

2. A method of manufacturing a contact lens comprising the steps of:

dosing a contact lens mold comprising optical mold surfaces with a reaction mixture, and sealing said optical mold surfaces, wherein said optical surfaces of said contact lens mold are exposed to a gaseous environment comprising greater than 0.5 percent oxygen just prior to said sealing step.

3. The method of claim 2, wherein for said gaseous environment comprising from greater than 0.5 to 0.6 percent, said optical surfaces of said contact lens mold are exposed to said gaseous environment for 200 to 4,000 seconds.

4. The method of claim 2 wherein said gaseous environment comprises from 0.6 to 21 percent oxygen.

5. The method of claim 2 wherein said gaseous environment comprises from 0.8 to 10 percent oxygen.

6. The method of claim 2 wherein said gaseous environment comprises from 1 to 10 percent oxygen.

7. The method of claim 6 wherein said optical surfaces are exposed to said gaseous atmosphere comprising 1 percent oxygen for between 80 to 10,000 seconds just prior to said sealing step.

8. The method of claim 6 wherein said optical surfaces are exposed to said gaseous atmosphere comprising 2 percent oxygen for between 20 to 10,000 seconds just prior to said sealing step.

9. The method of claim 4 wherein said optical surfaces are exposed to a gaseous atmosphere comprising from 0.6 to 1 percent oxygen for between 200 to 4,000 seconds just prior to said sealing step.

10. The method of claim 6 wherein said optical surfaces are exposed to a gaseous atmosphere comprising from 1.5 to 2.5 percent oxygen for between 160 to 4,000 seconds just prior to said sealing step.

11. The method of claim 2 wherein said optical surfaces of said contact lens mold are exposed to said gaseous environment just prior to said sealing step for a time and concentration indicated in the hatched areas of FIGS. 4 or 5.

12. The method of claim 2 wherein said optical surfaces of said contact lens mold are exposed to said gaseous environment just prior to said sealing step for a time and concentration indicated in the hatched areas of FIGS. 6 or 7.

13. The method of claim 2 wherein said optical surfaces of said contact lens mold are exposed to said gaseous environment just prior to said sealing step for a time and concentration indicated in the hatched areas of FIGS. 8 or 9.

14. The method of claim 2 wherein said contact lens mold comprises a front curve and a back curve, and said reaction mixture is placed into said front curve during said dosing step, and said sealing step is accomplished by placing said back curve onto said front curve.

15. The method of claim 11, wherein said contact lens mold comprises a material other than polystyrene, and further wherein said optical surfaces of said contact lens mold comprising said material other than polystyrene is exposed to said gaseous environment at a specified concentration of oxygen for a time equal to (Exposure time for PS)*(D*k for PS)/(D*k for NM)
Where:
NM=new material
PS=polystyrene
D=diffusivity of $O_2$ in the mold material, and
k=solubility of $O_2$ in the mold material;
wherein said Exposure time for PS and said specified concentration of oxygen is a point within the hatched marked area in FIGS. 4 or 5.

16. The method of claim 12, wherein said contact lens mold comprises a material other than polystyrene, and further wherein said optical surfaces of said contact lens mold comprising said material other than polystyrene is exposed to said gaseous environment at a specified concentration of oxygen for a time equal to:

(Exposure time for $PS$)*($D*k$ for $PS$)/($D*k$ for $NM$)

Where:
NM=new material
PS=polystyrene
D=diffusivity of $O_2$ in the mold material, and
k=solubility of $O_2$ in the mold material;
wherein said Exposure time for PS and said specified concentration of oxygen is a point within the hatched marked area in FIGS. 6 or 7.

17. The method of claim 13, wherein said contact lens mold comprises a material other than polystyrene, and further wherein said optical surfaces of said contact lens mold comprising said material other than polystyrene is exposed to said gaseous environment at a specified concentration of oxygen for a time equal to:

(Exposure time for $PS$)*($D*k$ for $PS$)/($D*k$ for $NM$)

Where:
NM=new material
PS=polystyrene
D=diffusivity of $O_2$ in the mold material, and
k=solubility of $O_2$ in the mold material;
wherein said Exposure time for PS and said specified concentration of oxygen is a point within the hatched marked area in FIGS. 8 or 9.

* * * * *